United States Patent

Rock

[15] 3,683,399
[45] Aug. 8, 1972

[54] INFORMATION RECORDER
[72] Inventor: William A. Rock, Caldwell, N.J.
[73] Assignee: Wagner Electric Corporation, Newark, N.J.
[22] Filed: Aug. 25, 1970
[21] Appl. No.: 66,807

[52] U.S. Cl. ................................................ 346/7
[51] Int. Cl. ............................................ G01d 5/02
[58] Field of Search .................. 346/7, 62–64, 123

[56] References Cited

UNITED STATES PATENTS

| | | | |
|---|---|---|---|
| 1,078,867 | 11/1913 | McGraw | 346/7 |
| 3,000,687 | 9/1961 | Haupt | 346/7 |
| 3,383,696 | 5/1968 | Fichter | 346/7 |
| 3,419,877 | 12/1968 | Roth | 346/7 |
| 3,521,291 | 7/1970 | Helmschrott et al. | 346/7 |

*Primary Examiner*—Joseph W. Hartary
*Attorney*—Joseph E. Papin

[57] ABSTRACT

An information recorder is adapted for mounting on apparatus which vibrates during operation, and an oscillating member is pivotally mounted in said recorder for oscillating movement relative thereto in response to vibrations of the apparatus. A stop is provided in the recorder to limit the oscillating range of the oscillating member in one direction, and a manually operable member is rotatably mounted in said recorder for movement between selected positions in a plane substantially normal to that in which the oscillating member is movable. The manually operable member is provided with a plurality of off-set abutments for engagement with the oscillating member and predeterminately spaced from the stop in each selected position of the manually operable member to limit the oscillating range of the oscillating member in the direction opposite to the one direction. A marking member is connected with the oscillating member to record the movements thereof on an associated chart, and an electric solenoid is selectively energized to relieve a spring load on the oscillating member to effect the oscillating movement thereof.

17 Claims, 3 Drawing Figures

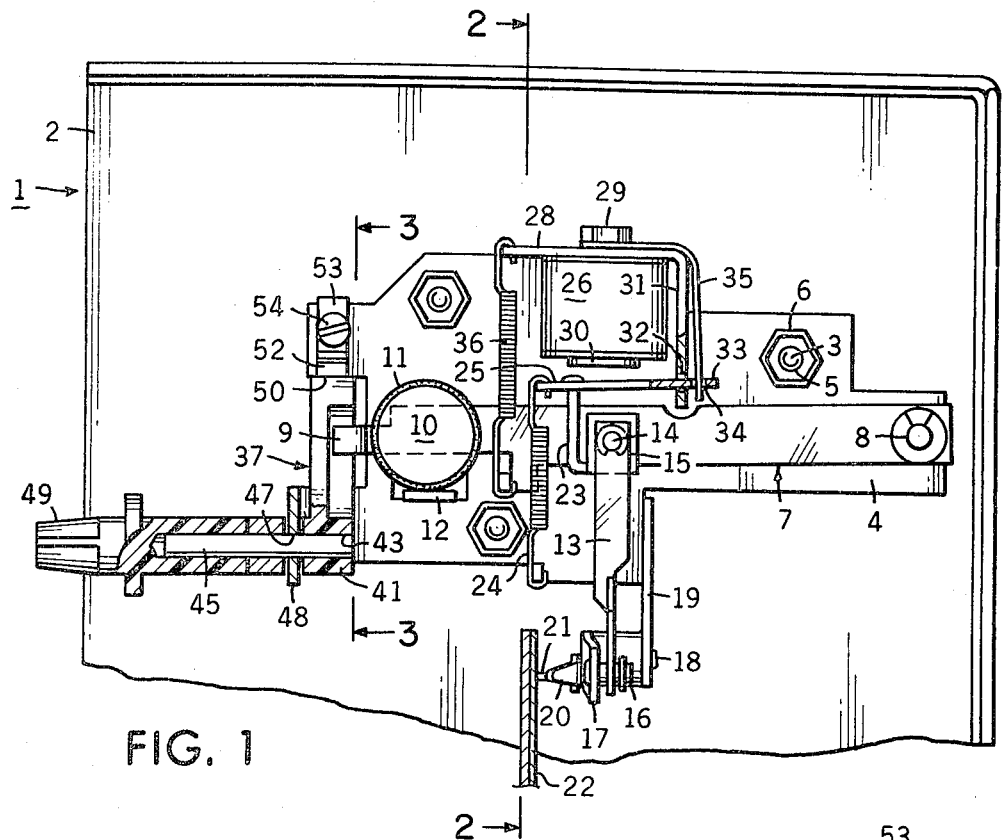
FIG. 1
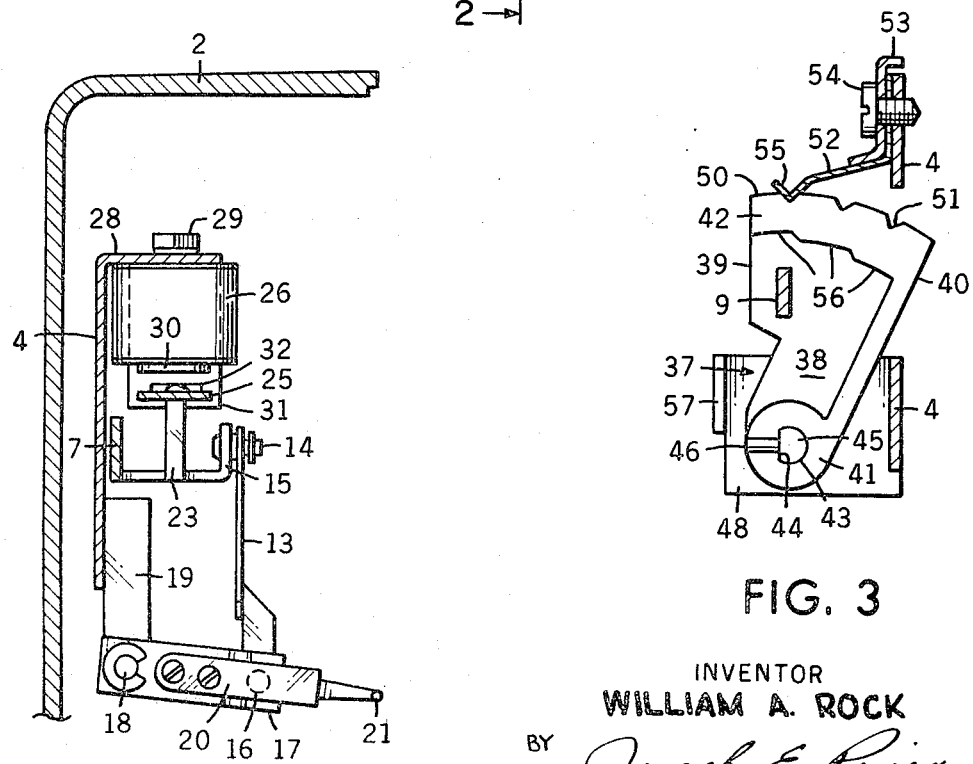
FIG. 2
FIG. 3
INVENTOR
WILLIAM A. ROCK
BY Joseph E. Papin

INFORMATION RECORDER

This invention relates in general to information recorders for apparatus which vibrates during operation and in particular to a member for indicating the running and stopping periods for such apparatus.

SUMMARY

In the past, information recorders or instruments were provided with oscillating members responsive to the apparatus vibration for recording running and stopping periods thereof, and manually operable members were also provided for engagement with the oscillating member to predeterminately limit the oscillating range of said oscillating members, as shown in U.S. Pat. No. 2,743,987 issued May 1, 1956, to K. Meer; however, one of the undesirable or disadvantageous features of such past recorders was that the oscillating range of the oscillating member was limited by spaced stops or abutments on the instrument housing while the manually operable member was movable therebetween effecting a tolerance problem. Another disadvantageous or undesirable feature of such past recorders was that the manually operable member was movable in the same or a parallel plane to that in which the oscillating member was movable which effected variations in the range of oscillation of the oscillating member and ancillary variations in the heighth of the scribed line on the recorder chart.

The principle object of the present invention is to provide a novel recorder which obviates the aforementioned disadvantageous or undesirable features, as well as others, and this and other objects and advantageous features of the present invention will become apparent hereinafter.

Briefly, one aspect of the invention includes a recorder adapted for mounting on vibrating apparatus having an oscillating member responsive to the apparatus vibrations for recording the running and stopping periods thereof, said oscillating member being movable in an oscillating range between a stop on said recorder and a plurality of off-set surfaces on a rotatable member manually movable to selected positions to predeterminately limit the oscillating range, said rotatable member being movable in a plane substantially normal to that in which said oscillating member is movable. Another aspect of the invention includes a resilient member normally urging the oscillating member toward an inoperative position engaged with the recorder stop, and solenoid means for selective energization to overcome said resilient member and permit oscillating movement of the oscillating member.

DESCRIPTION OF THE DRAWINGS

In the drawings which illustrate embodiments of the invention and wherein like numerals refer to like parts wherever they occur:

FIG. 1 is a partial sectional view of a recorder device showing an embodiment of the present invention therein, FIG. 2 is a partial sectional view taken along line 2—2 in FIG. 1, and FIG. 3 is a partial sectional view taken along line 3—3 of FIG. 1.

Referring now to the drawings in detail and in particular to FIGS. 1 and 2, an information instrument or recorder 1 is provided with an enclosing casing or housing 2 adapted for mounting on an apparatus, such as a vehicle or industrial machine or the like (not shown), which vibrates during its operation. The housing 2 is provided with a plurality of integrally formed studs 3 which extend therefrom, and a support plate or member 4 which is provided with a plurality of stud receiving apertures 5, is fixedly mounted on said housing by a plurality of jam nuts or retainers 6 received on said studs in engagement with said support plate.

As oscillating member, such as the pendulum arm 7, has one end pivotally connected by suitable means at 8 to the support plate 4 while the other end thereof defines an abutment portion 9. A weight or disc 10 having a resilient peripheral portion 11 is fixedly connected by suitable means (not shown) with the arm 7 adjacent to the abutment portion 9 thereof, and said disc is normally engaged with an abutment or stop, such as the flange 12 integrally formed with the support plate 4 and extending therefrom. A driving connection or pivotal link 13 has one end pivotally connected at 14 with a flange 15 integrally formed with the arm 7 adjacent to the midportion thereof, and the other end of said link is pivotally connected at 16 with a stylus or marking member 17. The marking member 17 is pivotally connected at 18 with a depending flange 19 integrally formed with the support plate 4, and a leaf spring 20 which has one end connected with the marking member 17 provides the force for urging a marker 21 on the other end thereof into marking engagement with a clock driven recorder chart 22. The recorder chart and time driving or clock mechanism therefor is well known in the art, and for the sake of simplicity, a detailed illustration and description thereof is omitted.

Another flange defining an abutment member 23 is integrally formed with the arm 7 adjacent to its midportion, and a spring 24 connected between the support plate 4 and an armature member or lever 25 of an electric solenoid 26 normally urges said armature member into engagement with said abutment member biasing the arm 7 in a counter-clockwise direction about its pivot 8 to normally engage the disc 10 with the support plate stop 12, as previously mentioned. The solenoid 26 is fixedly connected to another integrally formed support plate flange 28 by suitable means, such as the stud 29, and is provided with a pole piece 30 which is adapted for selective energization, such as for instance coincidentally with the actuation of a vehicle ignition switch (not shown). The flange 28 is provided with a depending portion 31 which is slotted at 32 to pivotally receive a tongue or distal portion 33 of the armature member 25 which extends therethrough. An aperture 34 is provided in the armature member distal portion 33, and a displacement preventing member or finger spring 35 has one end fixedly connected between the stud 29 and the support plate flange 28 while the other end extends through the aperture 34 in engagement with said armature member distal portion to prevent the displacement thereof from the flange slot 32. Another spring 36 is biased between the support plate flange 28 and the arm 7 urging said arm in a clockwise direction about its pivot 8, but the compressive force of the spring 36 is normally overcome by the opposing compressive force of the spring 24.

Referring now to FIGS. 1 and 3, an oscillating range delimiting device, such as the manually operable stop or selection member indicated generally at 37, is provided with fan or wedge shaped body 38 having opposed side edges 39, 40 interconnected with a hub 41 at the lower end of said body, and an arcuate, axially extending rim or flange portion 42 is provided in the upper end of said body between said opposed side edges. A bore 43 having a flat surface 44 thereon is provided through the hub 41, and the interior end of a mating shaft 45 is received in said bore being retained therein against displacement by a set pin 46 provided in said hub. The shaft 45 is rotatably mounted in an aperture 47 provided in a flange 48 integrally formed with the support plate 4, and an indicating or positioning knob 49 which extends exteriorly of the housing 2 for manual rotation or operation is fixedly connected by suitable means (not shown) to the other or exterior end of said shaft. The upper arcuate flange portion 42 of the body 38 is provided with a peripheral surface 50 having a plurality of position indicating indentations or grooves 51 therein, and a position maintaining or leaf-type spring 52 has one end fixedly connected with the support plate 4 by suitable means, such as the retainer 53 and screw 54, while the other end thereof defines a detent 55 which is urged into releasable locking engagement with the grooves 51 to maintain the selection member 37 against undesirable rotation from its preselected position, as discussed hereinafter. The upper arcuate flange portion 42 of the body 38 is also provided with a plurality of off-set abutment surfaces or stops 56 radially inwardly of the peripheral surface 50, which respectively correspond with the grooves 51 in the preselected positions of the selection member 37, and the surfaces 56 are provided for engagement with the arm abutment portion 9 to predeterminately delimit the oscillating movement or range thereof in any one of the preselected positions of the selection member 37, as discussed hereinafter. It should be noted that the selection member 37 is rotatable about its shaft 45 in a plane which is substantially normal to the plane in which the oscillating arm 7 is movable and that the abutment surfaces 56 are each rotatable into a position with respect to the arm abutment portion 9 which transcends or over laps the oscillating range or path thereof. The support plate 4 defines an abutment for engagement with the side edge 40 of the selection member body 38 to limit its rotative movement in its plane in one direction, and another flange 57 is provided on the flange 48 for engagement with the side edge 39 of said selection member body to limit its rotative movement in its plane in the other direction.

In the operation, the vehicle operator initially manually rotates the knob 49 and shaft 45 to turn the selection member 37 to a preselected position engaging one of the grooves 51 thereof with the detent 55 of the positioning spring 52, and in this manner, one of the abutment surfaces 56 is predeterminately positioned for engagement with the arm abutment portion 9 wherein the oscillating range or path thereof is limited or defined between the engagement of the disc 10 with the support plate stop 12 and the engagement of the arm abutment portion 9 with the preselected one surface 56 of said selection member. Of course, it is apparent that each of the surfaces 56 of the selection member 37 is preselected or assigned to a particular vehicle driver for driver identification purposes as determined from the chart markings, as discussed hereinafter. Upon the closure of the vehicle ignition switch (not shown) to start the vehicle, the pole piece 30 of the solenoid 26 is energized, as previously mentioned, and the armature member 25 is thereby pivoted about the flange slot 32 upwardly against the spring 24 to overcome the compressive force thereof toward a position with the upper side of said armature member in magnetic holding engagement with said solenoid pole piece and the lower side thereof disengaged from the abutment 23 of the arm 7. When the compressive force of the spring 24 is so overcome, the compressive force of the spring 36 moves the arm 7 upwardly or in a clockwise direction about its pivot 8 to disengage the disc 10 from the support member stop 12 and move the arm abutment portion 9 into engagement with the preselected one surface 56 of the selection member 37. When the vehicle is started and running, the vibrations established by road shocks on the vehicle are transmitted to the recorder 1 to effect oscillating movement of the oscillating arm 7 about its pivot 8, i.e., rapid and repetitive engagement and disengagement of the disc 10 with support plate stop 12 and of the arm abutment portion 9 with the preselected one surface 56 of the selection member 37. The driving link 13 effects movement of the marking member 17 about its pivot 18 coincidentally with the movement of the oscillating arm 7, and the preselected oscillating range is scribed by the marker 21 of said marking member on the moving chart 22.

From the foregoing it is apparent that the manual rotation of the selection member 37 into any one of its preselected positions engaging one of the grooves 51 with the positioning spring detent 55 moves a corresponding surface 56 thereof into an oscillating range delimiting position for engagement with the abutment portion 9 of the oscillating arm 7 to thereby predetermine the amplitude or range of the oscillating arm 7 and selectively confine the oscillating movement of said oscillating arm to different portions of said range. This predetermined movement or amplitude is then transmitted through the driving linkage 13 to the marking member 17 and recorded by the marker 21 thereof on the chart 22. The height of the markings on the chart 22 which correspond to the amplitude of the oscillating arm 7 between the stop 12 and the preselected one surface 52 of the selection member 35 is measurable to later identify the vehicle operator during the particular time of vehicle operation.

From the foregoing, it is now apparent that a novel information recorder 1 meeting the objects set out hereinbefore, as well as other objects and advantageous features, is provided and that changes or modifications as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. In an information recorder comprising a casing for mounting on apparatus which vibrates during its operation, support means in said casing and connected therewith, oscillating means pivotally connected with said support means for oscillating movement rotative thereto in response to the apparatus vibrations, flange means on said support means including a depending portion, and a slot in said depending portion, electric solenoid means mounted on said flange means and adapted for selective energization including a magnetizable pole piece, and armature means pivotally mounted in said slot having opposed sides for magnetic holding engagement with said pole piece and abutting engagement with said oscillating means, respectively, a pair of opposed stops on said support means for engagement with said oscillating means to limit the oscillating movement of said oscillating means, spring means connected between said support means and armature means normally urging one side of said armature means into abutting engagement with said oscillating means to maintain said oscillating means in engagement with one of said stops, said armature means being movable against the force of said spring means in response to the selective energization of said solenoid means to an energized position engaging the other side thereof in magnetic holding engagement with said solenoid pole piece and disengaging said one side from said oscillating means, other spring means opposing said first named spring means connected between said support means and said oscillating means, said other spring means urging said oscillating means to a position disengaged from said one stop and into engagement with the other of said stops when said armature means is in its energized position, and said oscillating means being thereafter movable in its oscillating range between said one and other stops when it is subjected to the vibrations of the apparatus, chart means mounted for movement in said casing to continuously receive markings thereon, marking means connected in marking engagement with said chart means and pivotally connected with said support means, and other means pivotally connected between said marking means and oscillating means to transmit the movement of said oscillating means to said marking means wherein the markings of said marking means on said chart means coincide with the movement of said oscillating means.

2. In an information recorder comprising a casing for mounting on apparatus which vibrates during operation, oscillating means pivotally mounted in said casing for oscillating movement within a predetermined amplitude in response to apparatus vibration, selectively energized electric solenoid means mounted in said casing including a magnetizable pole piece, and armature means pivotally mounted in said casing for magnetic holding engagement with said pole piece and oscillating movement preventing engagement with said oscillating means, and a pair of opposed resilient means respectively engaged with said armature means and said oscillating means, one of said resilient means being overcome upon the displacement of said armature means from its oscillating movement preventing engagement with said oscillating means into magnetic holding engagement with said pole piece in response to the selective energization of said solenoid means and the other of said resilient means being thereafter effective to urge said oscillating means toward a position permitting free oscillating movement thereof through its predetermined amplitude in response to apparatus vibration.

3. In an information recorder comprising a casing for mounting on apparatus which vibrates during operation, oscillating means pivotally mounted in said casing for oscillating movement within a predetermined range in response to apparatus vibration, electric solenoid means mounted in said casing and adapted for selective energization including a magnetizable pole piece, and armature means pivotally mounted in said casing and movable between positions in magnetic holding engagement with said pole piece and in abutting engagement with said oscillating means, respectively, spring means engaged with said armature means and normally urging it into abutting engagement with said oscillating means to prevent the oscillating movement thereof through its oscillating range, said armature means being movable against the force of said spring means toward its position in magnetic engagement with said pole piece and disengaged from said oscillating means upon the selective energization of said solenoid means, and other spring means engaged with said oscillating means and opposed to said first named spring means, said other spring means urging said oscillating means toward a position permitting free oscillating movement thereof through its predetermined oscillating range in response to apparatus vibration when said solenoid means is energized to actuate said armature means and overcome the force of said first spring means.

4. In an information recorder according to claim 3, comprising a pair of opposed abutment means in said casing for respective engagement with said oscillating means and defining the predetermined range of oscillating movement thereof, said oscillating means being urged into engagement with one of said abutment means by the force of said first named spring means when said armature means is in oscillating movement preventing engagement with said oscillating means, and said other spring means urging said oscillating means toward engagement with the other of said abutment means and permitting free oscillating movement of said oscillating means between said abutment means when said armature is in magnetic holding engagement with said pole piece.

5. In an information recorder according to claim 4, wherein said other abutment means includes manually operable means rotatably mounted in said casing and selectively movable between preselected positions, and a plurality of off-set abutment surfaces on said manually operable means each predeterminately spaced from said one abutment means for engagement with said oscillating means to confine the oscillating movement thereof to preselected portions of the oscillating range when said manually operable means is in its preselected positions, respectively.

6. In an information recorder according to claim 5, comprising means in said casing and engaged with said manually operable means to define the selected positions thereof.

7. In an information recorder according to claim 5, comprising a plurality of detent receiving portions on said manually operable means corresponding to the selected positions thereof, and detent means resiliently urged toward said manually operable means for releasable engagement with said detent receiving portions, said manually operable means being rotatable toward a preselected position to releasably engage one of said detent receiving portions with said detent means.

8. In an information recorder according to claim 5, comprising a pair of spaced opposed stops in said casing for respective abutting engagement with said manually operable means to predeterminately limit the rotative movement thereof in said casing.

9. In an information recorder according to claim 5, wherein said manually operable means includes a member rotatable between its preselected positions in a plane substantially normal to that in which said oscillating means is movable, said abutment surfaces being on said member and being in the path of said oscillating means for engagement therewith when said member is in its preselected positions, respectively, and shaft means rotatably mounted having an interior and in rotating driving engagement with said members and on opposed end exteriorly of said casing for receiving a manually applied rotative force.

10. In an information recorder according to claim 9, comprising a peripheral surface on said member in opposed relation with said abutment surfaces, a plurality of spaced grooves in said peripheral surface respectively defining the preselected positions of said member, and means for maintaining said member in its preselected positions including a detent for releasable locking engagement with said groove means, and spring means connected with said detent and urging it toward releasable locking engagement with said groove means, respectively.

11. In an information recorder according to claim 10, comprising a pair of opposed side edges on said member, a hub portion on said member adjacent to one end thereof between said side edges and connected with the interior end of said shaft, and an arcuate flange portion on the other end of said member radially spaced from said hub portion between said side edges and extending toward said oscillating means, said peripheral surface being on said flange portion and said abutment surfaces also being on said flange portion radially inwardly of said peripheral surface and opposed thereto.

12. In an information recorder according to claim 11, comprising opposed spaced stops connected with said casing for respective abutting engagement with said opposed side edges to predeterminately limit the rotatable movement of said member in response to the applied force on said shaft.

13. In an information recorder according to claim 3, comprising support means in said casing and fixedly connected thereto including flange means having a depending portion, and slot means in said depending portion, said solenoid means being mounted on said flange means, said armature means being pivotally mounted in said slot means, and opposed sides on said armature means for magnetic holding engagement with said pole piece and abutting engagement with said oscillating means, respectively.

14. In an information recorder according to claim 13, comprising aperture means in said armature means adjacent to said slot means, and means connected with said flange means and extending into said aperture means into engagement with said armature means to prevent displacement thereof from said slot means.

15. In an information recorder comprising a casing for mounting an apparatus which vibrates during operation, sheet means mounted for movement in said casing to receive markings thereon, marking means pivotally mounted in said casing and in marking engagement with said sheet means, oscillating means pivotally mounted in said casing for oscillating movement within a predetermined oscillating range in response to apparatus vibration including a free end portion, a driving member directly interconnected between said oscillating means and marking means to effect concerted movement of said marking means with said oscillating means, and means defining opposed side portions on said oscillating means adjacent to said free end portion, stationary abutment means in said casing for engagement with one of said opposed side portions to contain the oscillating movement in one direction of said oscillating means within the predetermined oscillating range, other means for engagement only with said oscillating means to contain the oscillating movement thereof in another direction opposite to the one direction within the predetermined oscillating range including shaft means rotatably mounted in said casing having an interior end within said casing and an opposed end extending exteriorly of said casing for receiving a manually applied rotative force thereon for selective rotatable movement between preselected positions, a sector member drivingly connected with said opposed end of said shaft means for concerted rotative movement therewith and rotatably mounted in said casing adjacent to said free end portion in a plane substantially normal to that in which said oscillating means is movable, and a plurality of off-set abutment surfaces on said sector member each being predeterminately spaced from said stationary abutment means and at least one of said abutment surfaces being in the path of said oscillating means for engagement with the other of said opposed side portions to contain the oscillating movement in the other direction of said oscillating means within a preselected different portion of the predetermined oscillating range when said shaft means and sector member are in their preselected positions, respectively.

16. In an information recorder according to claim 15, comprising a peripheral surface on said sector member, a plurality of spaced groove means in said peripheral surface respectively defining the preselected positions of said sector member, and means for maintaining said sector member in its preselected positions including a detent, and spring means connected with said detent and urging said detent into releasable locking engagement with said groove means, respectively.

17. In an information recorder according to claim 16, comprising a pair of opposed side edges on said sector member, a hub on said sector member at one end thereof connected with said side edges, the interior end of said shaft means being received in said hub, and an arcuate flange portion on said sector member at the other end thereof between said side edges, said peripheral surface being on said flange portion and said abutment surfaces also being on said flange portion radially inwardly of said peripheral surface and opposed thereto.

* * * * *

UNITED STATES PATENT OFFICE

CERTIFICATE OF CORRECTION

Patent No. 3,683,399          Issued August 8, 1972

William A. Rock

It is certified that error appears in the above-identified patent and that said Letters Patent are hereby corrected as shown below:

Column 2, line 10, "As" should read -- An --. Column 7, line 14, "and" should read -- end --; line 15, "members" should read -- member --; same line, "on" should read -- an --.

Signed and sealed this 8th day of May 1973.

(SEAL)
Attest:

EDWARD M. FLETCHER, JR.
Attesting Officer

ROBERT GOTTSCHALK
Commissioner of Patents